June 22, 1948.

T. CARROLL 2,443,723

MECHANISM FOR ADJUSTING WHEEL CARRYING
SPROCKETS IN VEHICLE CHAIN DRIVES

Filed Nov. 23, 1945

INVENTOR.
THOMAS CARROLL
BY
ATTORNEY

INVENTOR.
THOMAS CARROLL
BY
ATTORNEY

Patented June 22, 1948

2,443,723

UNITED STATES PATENT OFFICE 2,443,723

MECHANISM FOR ADJUSTING WHEEL CARRYING SPROCKETS IN VEHICLE CHAIN DRIVES

Thomas Carroll, Toronto, Ontario, Canada, assignor to Massey-Harris Co. Ltd., Toronto, Ontario, Canada, a corporation of Canada Application November 23, 1945, Serial No. 630,419

2 Claims. (Cl. 180—27)

The present invention relates to novel means for adjusting the driving chains on a self-propelled combine, or other chain driven machines.

In the present invention the driving or ground wheels are rotatably mounted on spindles which are mounted on the ends of an axle, and these driving wheels are driven by means of chains from shafts having connections to the differential mounted within a gear housing.

It is not practical to adjust the chains by shifting the driving sprockets, therefore I have provided a novel means whereby the spindles on which the driving or ground wheels are mounted may be shifted for chain adjustments. It will be understood that these spindles carry considerable weight, therefore it is not a simple matter to provide means for shifting the spindles on the axle and maintain alignment between sprockets by means which will stand the enormous weight and twisting and varying strains the spindles are subjected to.

In the present invention I provide preferably an axle tube with means on its ends for connection to the ground wheel spindles, wherein the tube has adequate strength and the connecting means may be conveniently made as strong or stronger than the tube or spindles.

An object of the present invention is to provide a chain adjusting means associated with the spindles and axle, wherein very close adjustments may be made after which the connections may be rigidly bound together.

A further object of the present invention is to provide an adjusting means which can be operated by any person of ordinary intelligence without danger of leaving the chains too tight or too loose.

An important object of the present invention is to provide a device of the character having adequate strength, a pleasing appearance and which can be manufactured at low cost.

To these and other useful ends my invention consists of parts, combinations of parts or their equivalents and mode of operation as hereinafter set forth and claimed and shown in the accompanying drawings in which:

Figure 2:
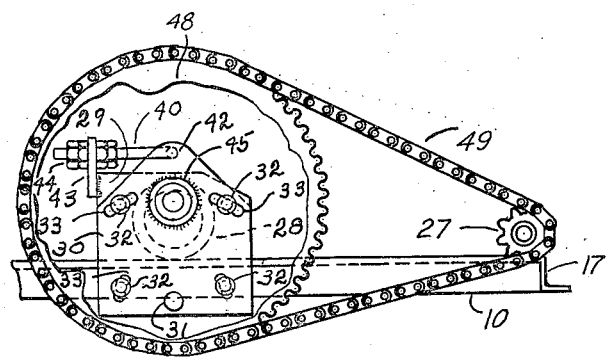
Fig. 2 is a side elevational end view of a fraction of my device as shown in Figure 1.

As thus illustrated the chassis frame is designated in its entirety by reference character A; the carrying and driving wheels are designated in their entireties by reference character B and the guiding wheels are designated in their entireties by reference character C.

Figure 1:
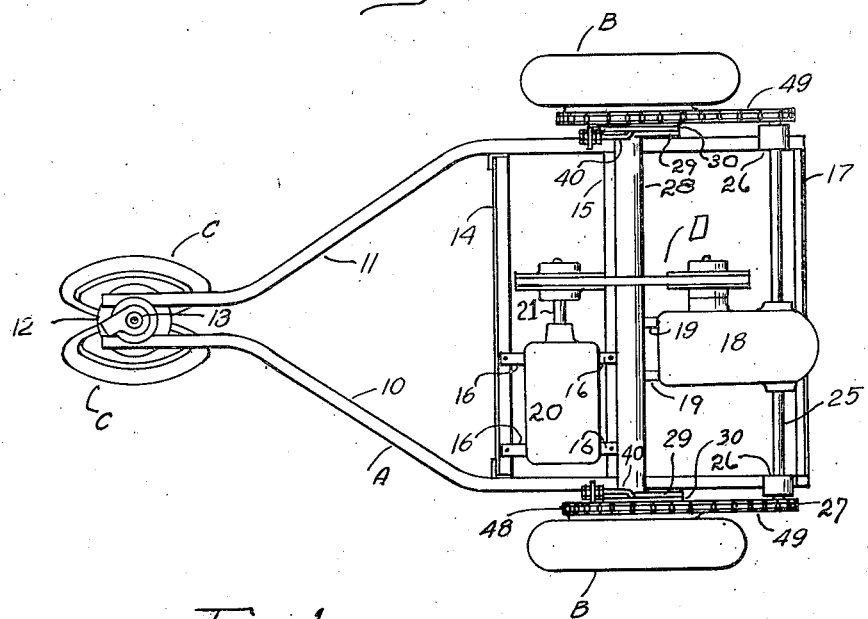
Fig. 1 is a top view of a combine chassis having my improved chain tightener.
Figure 3:
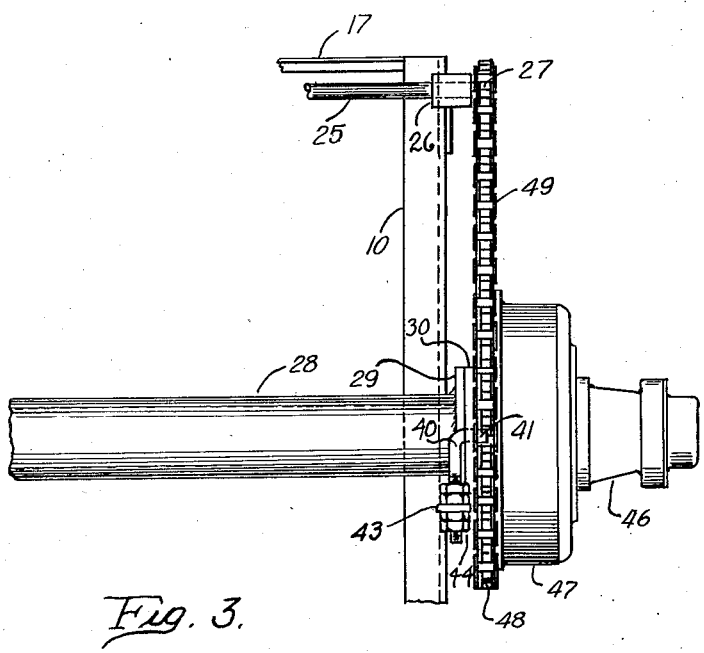
Fig. 3 is a top view of a fraction of the device as shown in Figure 1.
Figure 4:
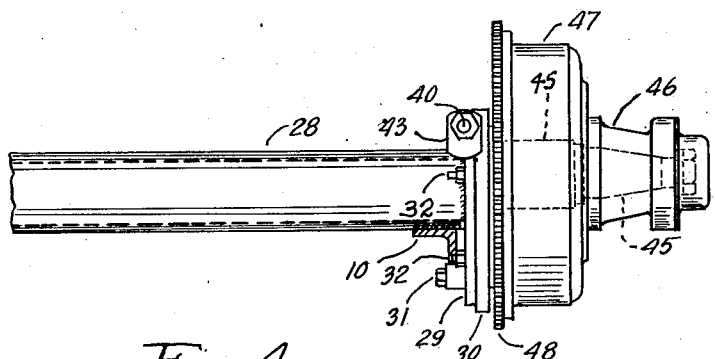
Fig. 4 is a rear view of a fraction of my device as shown in Figure 3.

The chassis frame consists of side members 10 and 11 and are preferably shaped about as shown in Figure 1, the rear ends being spaced apart and held into position by means of a block 12 and suitable bolts (not shown). A vertical spindle 13 is rotatably mounted in block 12 and wheels C are rotatably mounted on the lower end of this spindle (not shown). Means are provided with connections which lead to the driver's seat for guiding the device. Spaced transverse angle irons 14 and 15 are secured at their ends to members 10 and 11, the engine 20 is preferably positioned as illustrated and supported on members 14 and 15 by means of projecting feet 16. A cross bar 17 is preferably supplied, forming a connection between the front ends of members 10 and 11. Transmission gear and differential housing 18 is mounted at its front end on member 17, its rear end having feet 19—19 which extend to and are secured to member 15.

I provide preferably a V-belt transmission which in its entirety is designated by reference character D, forming an operating connection between the engine shaft 21 and transmission 18. Member D is preferably similar to the device shown in my copending application, V-belt transmission, or similar to Patent #2,336,002, December 7, 1943, C. E. Everett. Member 18 preferably consists of a gear shift transmission having an operating connection to a differential to which the inner ends of driving shafts 25—25 are connected. These driving shafts are rotatably mounted in bearings 26—26 which are rigidly secured to members 10 and 11, the outer ends of shafts 25 being provided with sprockets 27—27.

I provide an axle 28 which is secured to members 10 and 11 preferably by electric welding and having secured to its ends, preferably by electric welding, plates 29—29. It will be noted that axle 28 is of a length whereby plates 29 extend downwardly adjacent the outside edge of members 10 and 11.

I provide other plates 30—30. Plates 29 and 30 are hingedly secured together by means of a bolt or otherwise as at 31. A number of spaced bolts 32 are anchored to and extend through plates 29, each extending through slots 33 in plates 30, the slots being on a radius with pivots 31; thus when bolts 32 are loosened member 30 may be moved back and forth on pivots 31 as an axis.

I provide means for close adjustment of this movement as follows:

A bolt 40 is provided, the front L shaped end 41 thereof extending through an opening 42 in a raised portion of member 30. I secure a bracket 43 to the upper rear corner of member 29 having an opening at its upper end through which bolt 40 extends. Lock nuts 44 are provided.

Thus it will be seen that when bolts 32 are slightly loosened members 30 may be moved on pivots 31 by means of nuts 44, after which bolts 32 may be made taut. Spindles 45 are at their rear ends secured to plates 30 preferably by electric welding and the hubs 46 of wheels B are rotatably mounted on these spindles preferably by means of roller bearings. Hubs 46 have secured thereto brake drums 47 to the inner sides of which are mounted sprocket gears 48, chains 49—49 form an operating connection between sprockets 27 and 48.

Thus it will be seen that by slightly loosening the nuts on bolts 32, nuts 44 may be used for adjusting the tautness of the chains, and that any person of ordinary intelligence can make these adjustments. Furthermore clearly when bolts 32 are made taut spindles 45 will be firmly held into position and because of the design and fastenings between members 29 and 30 the structure is easily manufactured and has adequate strength for the purpose.

It will also be noted that it is a comparatively simple manufacturing and assembling problem which insures alignment of the sprockets, an important matter in a chain drive of the character.

Having thus shown and described my invention I claim:

1. A device of the character described comprising, a chassis frame, a one piece stationary axle rigidly secured transversely to said frame with its ends positioned adjacent the outside edges of the frame, plates secured to the ends of said axle and near the tops of the plates, other plates hingedly secured adjacent their bottoms to hinges adjacent the bottoms of said first plates to form therewith two pairs of plates, anchoring brackets secured to an upper corner of said first plates having threaded anchor bolts which extend therethrough with one end connected to the upper ends of said other plates, nuts on said anchor bolts positioned on opposite sides of said anchoring brackets, a number of spaced slots in one plate of each pairs of plates and being positioned near the outer edges of the plates, each being substantially on a radius with said hinges, bolts extending through said slots and through the adjacent plates and adapted to firmly bind the pairs of plates together, spindles secured to said other plates near the tops thereof, carrying and driving wheels rotatably mounted on said spindles each having a sprocket secured thereto, two shafts each rotatably mounted on bearings which are secured to said frame a fixed distance from said stationary axle and having mounted on their outer ends sprockets, means for driving said two shafts, chains forming operating connections between adjacent sprockets, whereby said other plates may be moved on said hinges as axes for adjusting the tautness of said chains and whereby said pairs of plates may be firmly held together and in position by all of said bolts after the chains have been adjusted.

2. A device of the character described comprising, a chassis frame, a one piece stationary axle rigidly secured transversely on said frame with its ends positioned adjacent the outside edges of the frame, plates secured to the ends of said axle and near the tops of the plates, other plates hingedly secured adjacent their bottoms to hinges adjacent the bottoms of said first plates to form therewith two pairs of plates, means associated with said other plates whereby the other plates may be manually moved relative to the first plates on their hinged connections as axes, a number of spaced slots in one plate of each pairs of plates and being positioned near the outer edges of the plates, each being substantially on a radius with said hinges, bolts extending through said slots and through the adjacent plates and adapted to firmly bind the pairs of plates together, spindles secured to said other plates near the tops thereof, carrying and driving wheels rotatably mounted on said spindles each having a sprocket secured thereto, two shafts each rotatably mounted on bearings which are secured to said frame a fixed distance from said stationary axle and having mounted on their outer ends sprockets, means for driving said two shafts, chains forming operating connections between adjacent sprockets, whereby said other plates may be moved on said hinges as axes for adjusting the tautness of said chains and whereby said pairs of plates may be firmly held together by said bolts after the chains have been adjusted.

THOMAS CARROLL.

REFERENCES CITED

The following references are of record in the file of this patent:

UNITED STATES PATENTS

| Number | Name | Date |
| --- | --- | --- |
| 635,446 | Moskowitz | Oct. 24, 1899 |
| 721,635 | O'Malley | Feb. 24, 1903 |
| 904,687 | Donahoe | Nov. 24, 1908 |
| 1,269,034 | Woodworth | June 11, 1918 |
| 1,392,421 | Lang | Oct. 4, 1921 |
| 1,683,662 | Keller | Sept. 11, 1928 |
| 2,123,975 | Thiemann | July 19, 1938 |
| 2,258,778 | Lewis | Oct. 14, 1941 |
| 2,284,441 | Murad | May 26, 1942 |